United States Patent [19]

Shiki et al.

[11] 4,209,754
[45] Jun. 24, 1980

[54] CERAMIC CAPACITORS

[75] Inventors: Haruo Shiki; Yoshiteru Saito; Marefumi Katsuki, all of Tokyo; Kikuo Wakino, Nagaokakyo, all of Japan

[73] Assignees: Nippon Electric Co., Ltd., Toyko; Murata Manufacturing Co., Ltd., Kyoto, both of Japan

[21] Appl. No.: 940,337

[22] Filed: Sep. 7, 1978

[30] Foreign Application Priority Data

Sep. 12, 1977 [JP] Japan ............................. 52-123107[U]
Sep. 12, 1977 [JP] Japan ............................. 52-123108[U]

[51] Int. Cl.² ......................... H03F 3/04; H01L 27/02
[52] U.S. Cl. .................................... 330/307; 330/289; 361/274; 361/321
[58] Field of Search .................. 330/289, 307; 357/51; 361/321, 322, 274

[56] References Cited

PUBLICATIONS

Miller et al–"Chip Capacitor Configuration"–IBM Technical Disclosure Bulletin, p. 941, Dec. 1967.

Primary Examiner—James B. Mullins
Attorney, Agent, or Firm—Birch, Stewart, Kolasch & Birch

[57] ABSTRACT

A ceramic capacitor with at least one semiconductor device mount hole, comprising a metal substrate and a dielectric ceramic layer provided with electrode layer on its surfaces and mounted on the substrate. At least the lateral surface of the mount hole in the electrode layer bound to the substrate is covered with an insulating material. The ceramic capacitors have good thermal conductivity and adapted to be used with semiconductor devices designed for power applications.

6 Claims, 6 Drawing Figures

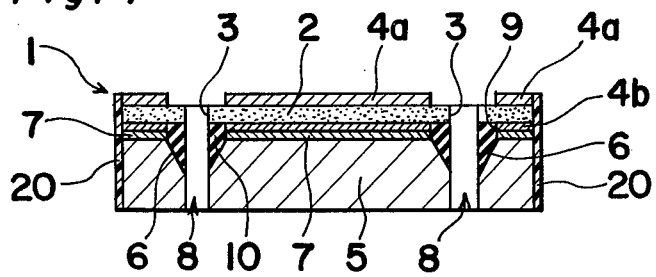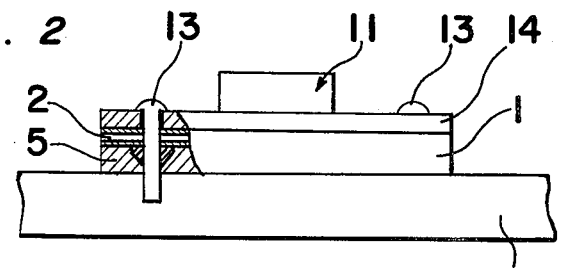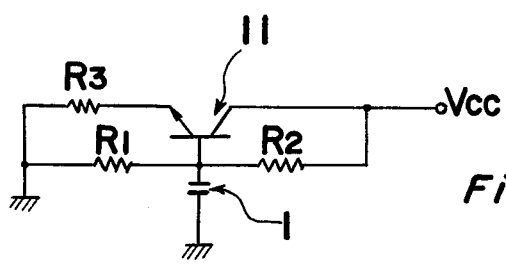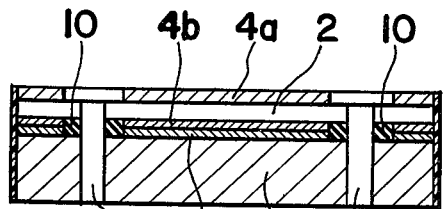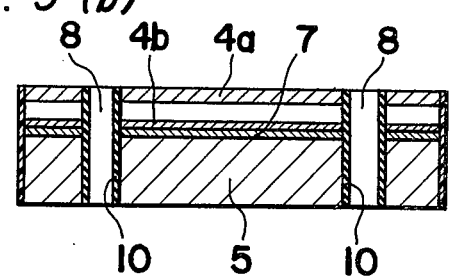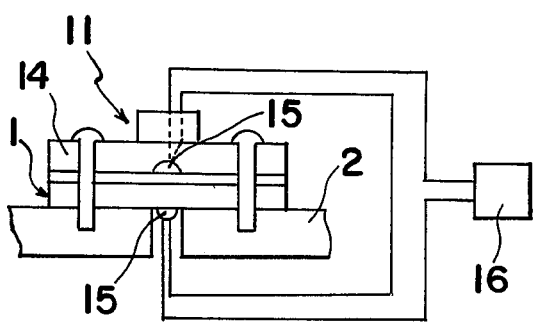

CERAMIC CAPACITORS

This invention relates to novel and useful ceramic capacitors. More particularly, it relates to ceramic capacitors with good thermal conductivity adapted to be used with semiconductor devices designed for power applications.

In general, the maximum power that a transistor can safely dissipate at its collector (specified as Pc) is a function of the maximum junction temperature $T_J$, the ambient temperature Ta, and the thermal resistance from the semiconductor chip to ambient $\theta$. This relation is:

$$P_c = \frac{T_J - T_a}{\theta}$$

Because the maximum junction temperature $T_J$ is usually determined by a semiconductor material in itself, attempts to increase the maximum power allowable dissipation is put on improvements in a structure of heat sink which provides lowering of thermal resistance between the semiconductor to ambient.

Most semiconductor devices designed for power applications (power transistors and power ICs) are usually used with some type of heat sink, i.e., either an external heat sink or a chassis, to increase the effective heat-dissipation area of a semiconductor device case and provide low heat-resistance from the case to ambient. When such semiconductor devices are to be mounted on heat sinks, any electrical insulation is usually required between the case and heat sink. For example, when microwave high power transistors are to be mounted on heat sinks, an insulating plate of mica is added between the transistor case and heat sink because it is usually required that the base of the transistor is biased for direct currents and bypassed to ground for high frequency currents. The use of mica provides sufficient electrical insulation between the transistor case and heat sink, and introduces a certain amount of capacitance. This capacitance may be used as an external bypass capacitor to provide a high frequency current path of comparatively low impedance between the base and earth. In this case, however, it is required to use mica wafers of a large size to obtain desird capacitance, resulting in the deterioration of high frequency characteristics of circuits.

Because good electrical insulators usually are also good thermal insulators, it is difficult to provide electrical insulation without introducing some thermal resistance between the case and heat sink. For example, when mica wafers with 30 to 80$\mu$ in thickness are used as insulating plates, thermal resistance from the case to chassis is approximately 0.5° to 1.5° C./W which does not satisfy the requirement that the thermal resistance must be sufficiently lowered. The thermal resistance to ambient may be lowered by further thinning mica wafers, but it is impossible to ensure the preparation of wafers with good quality and surface precision. The use of beryllia, instead of mica, enables to lower the thermal resistance, but results in the increase of cost and lowering of mechanical strength.

It is therefore a general object of the present invention to provide ceramic capacitors which provide low heat-resistance and large capacitance.

According to the present invention, there is provided a ceramic capacitor with at least one semiconductor device mount hole, comprising a metal substrate and a dielectric ceramic layer mounted thereon, said ceramic layer being provided on its both surfaces with electrode layers, at least the lateral surface of the mount hole in electrode layer bound to the substrate being covered with an insulating material.

The dielectric ceramic layer may be prepared by any ceramic material known in the art, but it is preferred to make the ceramic layer as thin as possible. In the preferred embodiments of the present invention, the dielectric ceramic layer may have a thickness of 20 to 200$\mu$. Because, the ceramic layers less than 20$\mu$ will result in a lowering of mechanical strength, and the ceramic layers more than 200$\mu$ will results in the increase of thermal resistance and a lowering of the heat sink from semiconductor devices to ambient.

When the electrode layer bound to the substrate is provide with a mount hole having a larger diameter than that of the mount hole passing through the capacitor, the insulating material fills the space formed between the mount hole and the hole of the elelctrode layer, and ensures that the short-circuit between two electrode layers are prevented even when the electroconductive binding layer between the electrode and substrate protruded beyond the binding surface between them.

The present invention will be further apparent from the following description with respect to examples and the accompanying drawings, in which:

FIG. 1 is a cross sectional view of a ceramic capacitor embodying the present invention;

FIG. 2 is a cross sectional view showing mounting of the ceramic capacitor of FIG. 1;

FIG. 3 is an equivalent circuit of a high frequency power amplifier using the ceramic capacitor of FIG. 1; and FIG. 4 is a diagrammatic view of test set-up for measurement of thermal resistance.

FIGS. 5(a) and 5(b) show cross sectional views of alternative embodiments of the present invention.

Referring to FIG. 1, there is shown a basic form of a ceramic capacitor 1 embodying the present invention, which comprises a dielelctric ceramic layer 2 having semiconductor device mount holes 3, two electrodes 4a, 4b formed on both surfaces of the layer 2 and, a substrate 5 formed of a metal such as iron and provided with funnel-like mount holes 6. The layer 2 is united with the substrate 5 by an electroconductive binding layer 7 formed of solder, electroconductive paste or the like. The ceramic capacitor 1 is provided with two semiconductor device mount holes 8 passing through the capacitor 1 from its one surface to the other. The electrodes 4a and 4b are also provided with mount holes 9 having a diameter larger than that of the mount holes 8, but equal to the diameter of the base portion of the funnel-like mount holes 6. All holes of the wafer 3, electrodes 4a, 4b and substrates 5 are in concentric relationship with one another. The space surrounded by the mount hole 8 and holes 6 and 9 are filled with an insulating material 10 such as synthetic resin, rubber or the like. The ceramic capacitor 1 is coated with an insulating material over the edge portion thereof.

The above ceramic capacitor may be produced in the following manner: A wafer of a dielectric ceramic is prepared in the well-known manner, and then provided with two spaced holes 3 at the portions corresponding to the positions of mount holes of a semiconductor device to be mounted. The wafer 2 is painted a masking pattern on the area surrounding the holes 3 and then baked with silver to form an electrode layer 4b. Thus, the electrode layer 4b will have recesses or holes 9 having a diameter greater than that of the holes of the wafer. After removal of the masking pattern, the wafer 2 is soldered at the electrode 4b to a substrate 5 having funnel-like holes 6 in such a maner that the holes (3, 6, 9) are in concentric relationship with one another, thereby forming an electroconductive binding layer 7. The thus obtained composite structure is filled its holes (3, 6 and 9) with an insulating material 10, and then drilled in such a manner as to utilize the holes (3,6,9) already existing therein to make mount holes 8 in the composite structure. After or before drilling, the exposed surface of the wafer is ground to form a thin dielectric ceramic layer 2 of desired thickness, and then an electrode layer 4a is formed thereon in the same manner as above. The thus produced unit is then cut or diced to form individual capacitor chips. These individual chips are then coated with an insulating material 20 over the edge portion thereof to complete the capacitor 1 shown in FIG. 1.

When a ceramic capacitor 1 is to be applied for mounting of a high frequency power transistor 11, the capacitor 1 is mounted on a mounting plate or chassis 12 which acts as a heat sink, and then the transistor 11 is placed on the capacitor, as shown in FIG. 2, so as to align their holes with corresponding threaded holes in the chassis 12 and bolted with threaded bolts 13, the bolts being covered with an insulating material such as synthetic resin.

Thus, the base of the transistor 11 is connected in series to the capacitor 1, since the base is directly connected to the case 14. This capacitor is effectively used as a bypass capacitor, as shown in FIG. 3, to provide a high frequency current pass of comparatively low impedance between the base and earth. Further, the capacitor provides sufficient electrical insulation between the case and heat sink without introducing a large thermal resistance between them.

EXAMPLES 1-2

Using wafers of aluminous porcelain and titanium oxide ceramic, respectively, ceramic capacitors are prepared by the procedure mentioned above. Substrates used are made of iron and have the size of 10 mm×25 mm×1.0 mm. The thickness of the aluminous porcelain layer in the product is 50μ and that of the titanium oxide layer is 100μ.

These ceramic capacitors were subjected to measurement of thermal resistance and electrostatic capacity. Test set-up for thermal resistance at operated conditions of high frequency power transistor 11 with a maximum power dissipation of 15 W is shown in FIG. 4. A pair of thermocouples 15 on respective surfaces of the capacitor 1 are connected in series with one another and connected to a voltmeter 16. Results are shown in Table 1 together with the results for the conventional arrangement in which a mica wafer with the size of 10 mm×25 mm×0.03 mm is used as an insulating plate.

Table 1

| insulating material | thickness (μ) | thermal resistance (° C./W) | electrostatic coupacity (pF) |
|---|---|---|---|
| mica | 30 | 0.510 | 177 |
| aluminous | | | |

Table 1-continued

| insulating material | thickness (μ) | thermal resistance (° C./W) | electrostatic coupacity (pF) |
|---|---|---|---|
| porcelain | 50 | 0.016 | 160 |
| titanium oxide ceramic | 100 | 0.150 | 780 |

As can be seen from the above table, the ceramic capacitors of the present invention have thermal resistance smaller than that of the conventional insulating plate, and enables to effect heat sink efficiently. Further, the capacitors of the present invention have electrostatic capacity equal to or greater than that of mica insulator, from which it will be seen that the ceramic capacitors having the construction as mentioned above can effectively be used as a capacitor for preventing the anomalous oscillation of high frequency or microwave power amplifier circuits. The use of substrates of metal such as iron has its own advantages that it increases the mechanical strength of ceramic capacitors and prevents the cracking or breaking of the ceramic layer.

In the foregoing embodyments, electrode 4b and substrate 5 are provided with holes (6,9) having a larger diameter than that of the semiconductor device mount holes 8, and the spaces between these holes are filled with an insulating material 10 to prevent short circuiting of the electrodes 4a, 4b. However, many variations are possible as shown in FIG. 5. In FIG. 5a, holes 9 with a large diameter are provided only in an electrode 4b, and the lateral surface of the holes 9 are covered with an insulating material 10. FIG. 5b shows another insulation from, in which mount holes 8 are covered at its whole lateral surface with an insulating material 10, and the substrate 5, ceramic layer 2 and electrode layers 4a, 4b have the same diameter holes.

What we claim is:

1. A ceramic capacitor comprising a substrate, a dielectric ceramic layer provided with electrode layers on both of its surfaces, said ceramic layer being disposed on said substrate and joined at one of its electrode layers with said substrate to form a capacitor, and at least one mount hole passing through the capacitor and defining at least one hole in the electrode layer disposed between said substrate and said ceramic layer which has a diameter which is larger than that of the mount hole but which is concentric with said mount hole, the space formed between said mount hole and the hole of said electrode layer containing an insulating material to prevent a short circuit between electrode layers.

2. The ceramic capacitor according to claim 1 wherein the substrate has at least one funnel-like hole which is concentric with said mount hole and has a base with a diameter equal to that of the hole of the one electrode layer between the ceramic layer and the substrate, the space formed between the mount hole and the funnel-like hole of the substrate containing an insulating material.

3. The ceramic capacitor according to claim 1 wherein the dielectric ceramic layer has a thickness of 20 to 200μ.

4. The ceramic capacitor according to claim 1 wherein said electrode layers are silver.

5. The ceramic capacitor according to claim 1 wherein an electroconductive binding layer is disposed between the electrode layer and the substrate, said binding layer having at least one hole having a diameter substantially equivalent to that of said electrode.

6. In a high frequency power amplifier, including the combination of a semiconductor device designed for power application, a ceramic capacitor and a heat sink, said semiconductor device being mounted on said heat sink, but electrically insulated therefrom by said ceramic capacitor disposed therebetween, said ceramic capacitor comprising a substrate, a dielectric ceramic layer provided with electrode layers on both of its surfaces, said ceramic layer being disposed on said substrate and joined at one of its electrode layers with said substrate to form a capacitor, and at least one mount hole passing through the capacitor and defining at least one hole in the electrode layer disposed between said substrate and said ceramic layer which has a diameter which is larger than that of the mount hole but which is concentric with said mount hole, the space formed between said mount hole and the hole of said electrode layer containing an insulating material to prevent a short circuit between electrode layers.

* * * * *